United States Patent [19]

Bane

[11] Patent Number: 5,366,087
[45] Date of Patent: Nov. 22, 1994

[54] RESEALABLE PRESSURE SENSITIVE CLOSURE LABEL

[75] Inventor: John C. Bane, Grand Island, N.Y.

[73] Assignee: Moore Business Forms, Inc., Grand Island, N.Y.

[21] Appl. No.: 997,540

[22] Filed: Dec. 28, 1992

[51] Int. Cl.⁵ .............................. B65D 33/20
[52] U.S. Cl. .................. 206/459.5; 206/460; 206/807; 206/813; 383/5; 383/81; 40/638
[58] Field of Search ............ 206/459.5, 460, 807, 206/813, 816; 383/5, 81, 89; 40/630, 638

[56] References Cited

U.S. PATENT DOCUMENTS

| Re. 30,958 | 6/1982 | White . | |
|---|---|---|---|
| 2,586,039 | 2/1952 | Heggedal | 40/638 X |
| 2,845,728 | 8/1958 | Huber | 40/638 |
| 3,711,011 | 1/1973 | Kugler . | |
| 3,942,713 | 3/1976 | Olson et al. . | |
| 4,066,167 | 1/1978 | Hanna et al. . | |
| 4,415,087 | 11/1983 | Clayton et al. . | |
| 4,441,613 | 4/1984 | Hain et al. . | |
| 4,543,139 | 9/1985 | Freedman et al. . | |
| 4,739,879 | 4/1988 | Nakamura . | |
| 4,902,141 | 2/1990 | Linnewiel | 383/89 X |
| 4,902,142 | 2/1990 | Lammert et al. . | |
| 4,911,563 | 3/1990 | Ciani | 383/89 |
| 5,035,518 | 7/1991 | McClintock . | |
| 5,217,307 | 6/1993 | McClintock | 383/5 X |

FOREIGN PATENT DOCUMENTS

| 283064 | 9/1988 | European Pat. Off. . |
|---|---|---|
| 517566 | 12/1992 | European Pat. Off. . |
| 2523085 | 9/1983 | France . |
| 2077696 | 12/1981 | United Kingdom . |

Primary Examiner—Paul T. Sewell
Assistant Examiner—Jacob K. Ackun, Jr.
Attorney, Agent, or Firm—Nixon & Vanderhye

[57] ABSTRACT

A label is used to seal a package and provide an indication that an end edge of the package has been opened, while also allowing resealing of the package end edge. The label comprises a substrate with top and bottom faces and first and second parallel edges, with indicia (such as price per unit weight, weight, and total price indicia) imaged on the top face. A perforation generally bisects the substrate into generally equally-sized first and second portions, the perforation extending generally transverse to the first and second edges. On the bottom face of the first portion is permanent adhesive (e.g., pressure sensitive), while on the bottom face of the second portion is repositional adhesive. To open the package one tears along the perforation line to detach the second portion of the label from the package, and then tears the first label portion at the package end edge. To reseal the end edge, one places the second label portion over the end edge, the repositional adhesive holding it in place.

6 Claims, 1 Drawing Sheet

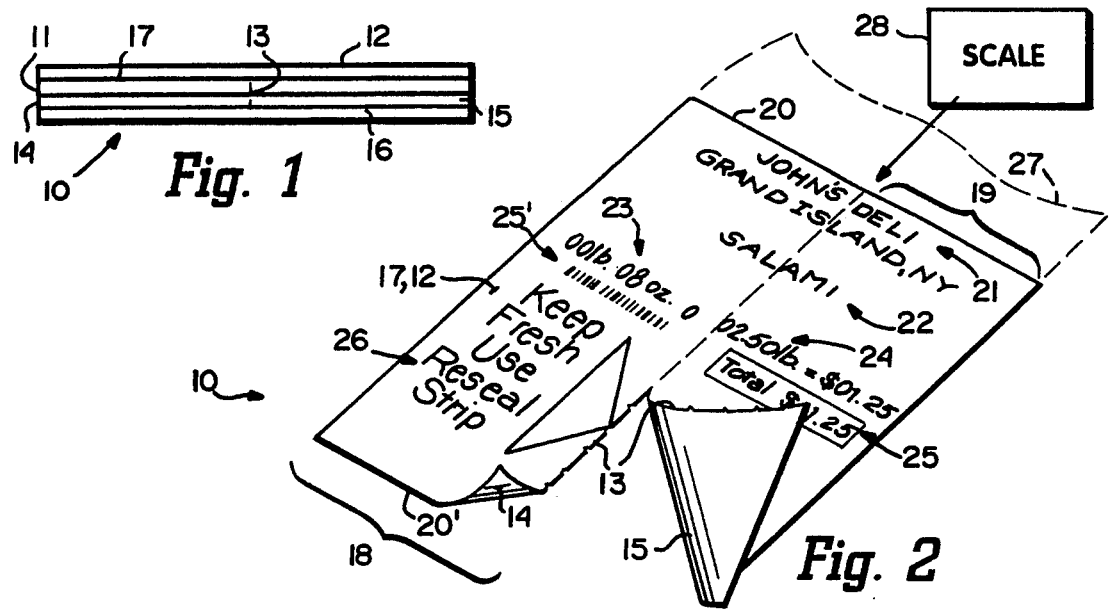
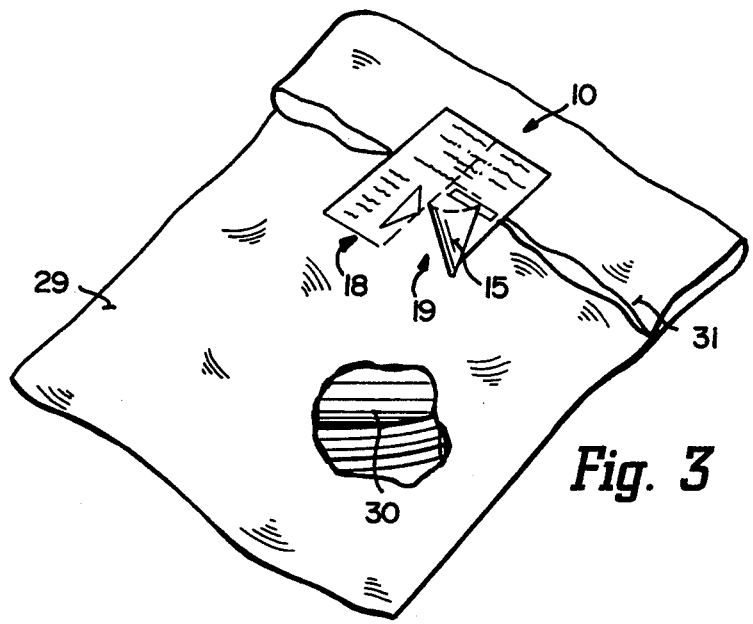
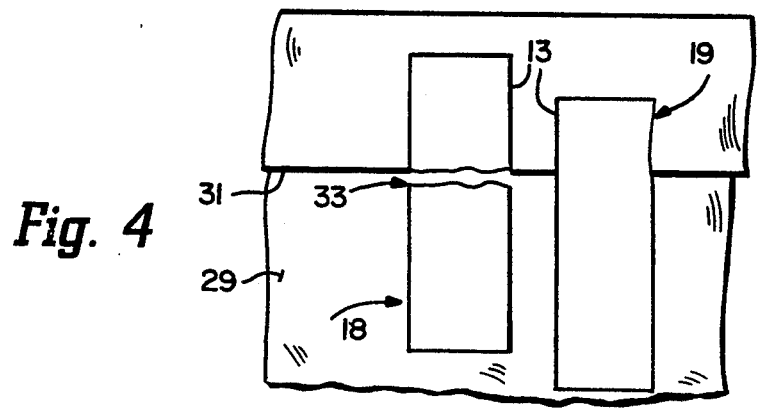

RESEALABLE PRESSURE SENSITIVE CLOSURE LABEL

BACKGROUND AND SUMMARY OF THE INVENTION

There are many environments in which it is desirable to determine whether or not a package has been tampered with, while at the same time allowing resealability of the package. One exemplary (only) situation is preventing fraud or package content tampering for packages produced at a retail establishment, such as conventional delicatessen and/or bakery counters where cold cuts, cheese, bread, and the like are packaged and labeled in the retail establishment. With presently existing "deli labels" it may be possible for the user to remove the label from one package and place it on another, or to open up the package and insert other materials into it. Alternatively, if a conventional deli label is constructed to prevent—without destruction—opening of the package, then the label does not provide a resealing function.

According to the present invention a label, package, and method are provided which have the advantages of detecting when a package sealed by a label has been tampered with, yet allowing ready resealing of the package with the label.

According to one aspect of the present invention a label is provided, which label has broad uses, particularly in packaging (such as in deli or bakery environments). The label comprises: A substrate having a top face and a bottom face, and first and second generally parallel edge portions. Indicia imaged on the top face. Means defining a line of weakness in the substrate generally transverse to the first and second edge portions to divide the substrate into first and second body portions to provide for easy detachment of the first and second body portions from each other. Permanent adhesive provided in association with the bottom face of the first body portion of the substrate, and repositional adhesive provided in association with the bottom face of the second body portion of the substrate.

The means defining a line of weakness in the label comprises a perforation line, and typically the line of weakness bisects first and second linear edges so that the first and second body portions are of about the same size. The indicia that is imaged on the top face may include price per increment indicia, incremental units indicia, and total price indicia. The indicia may be imaged on a thermally sensitive coating on the top face, as by utilizing a Hobart scale. The indicia can be imaged so that it extends across both the first and second portions so that both the first and second portions must be in place for the indicia to be completely readable. The permanent and repositional adhesives preferably coat substantially the entire bottom face of the substrate.

According to another aspect of the present invention a package is provided. The package comprises: A packaging material including an end edge portion defining an end of the packaging material. A label placed over the end edge portion to hold the end edge portion in a closed position, and the label including means for providing an indication that the end edge portion has been opened while allowing resealing of the end edge portion.

Typically, the label comprises: A substrate having first and second portions with a top face and a bottom face, and wherein the means for providing an indication that the end edge portion has been opened while allowing resealing of the end edge portion comprises permanent adhesive associated with the first portion bottom face, repositional adhesive associated with the second portion bottom face, and a line of weakness at the border between the first and second portions allowing ready separation of the label at the line of weakness, the line of weakness extending generally transverse to the end edge portion.

The indicia and line of weakness for the package label are essentially as described above. The packaging material may comprise a wide variety of materials, but for the deli and bakery environment would typically comprise thin sheet wrapping material having an end edge overlying another portion of the thin sheet wrapping material so that the label is attached to the wrapping material on either sides of the end edge.

The invention also contemplates a method of sealing, opening and resealing a package (having a label as described above). The method comprises the following steps: To seal the package, (a) placing the label over the end edge of the package so that the line of weakness of the label extends generally transverse to end edge, and both the first and second portions of the label span the end edge. To open the package, (b) grasping the second portion of the label and pulling it away from the package while tearing along the line of weakness, the repositional adhesive allowing removal of the second portion from the package; and (c) tearing the first portion of the label at the end edge so that the end edge is no longer prevented by the label from being opened, and to reseal the package, (d) placing the second portion over the end edge to close the end edge, the repositional adhesive holding the end edge closed. Typically, there is also the further step, prior to step (a), of imaging indicia on the top face of the label (as by thermal imaging) indicating the incremental units in the package (e.g, weight), the per incremental unit price, and the total price.

It is the primary object of the present invention to provide a simple yet effective label, package, and method which indicates tampering, yet allows ready resealing. This and other objects of the invention will become clear from an inspection of the detailed description of the invention, and from the appended claims.

BRIEF DESCRIPTION OF THE DRAWINGS

FIG. 1 is a side view, greatly enlarged for clarity of illustration, of an exemplary label according to the present invention;

FIG. 2 is a top perspective view of a label of FIG. 1 (with release liner removed), with the corners of both body portions of the label turned up for clarity of illustration;

FIG. 3 is a top perspective view of a package according to the invention which utilizes the label of FIGS. 1 and 2 and shows the first stage of opening of the package; and FIG. 4 is a top plan view of the package of FIGURE 3 after it has been opened and resealed.

DETAILED DESCRIPTION OF THE DRAWINGS

An exemplary label 10 according to the present invention is seen most clearly in FIGS. 1 and 2. The label 10 includes the substrate 11 which may have a thermally sensitive coating 12 on the top face thereof, and has a line of weakness (a perforation as illustrated in the drawings although a score line or die cut, or the like, could also be used) 13 essentially bisecting the substrate 11. On the bottom face of the substrate 11 are coatings of adhesive on opposite sides of the perforation line 13, a coating of permanent adhesive 14, and a coating of repositional adhesive 15.

A release liner 16 (see FIG. 1) may cover the coatings 14, 15. This is particularly useful if the label 10 is to be in roll form; however, alternatives are also possible. For example, instead of the release liner 16, a release coating could be provided on top of the thermal imaging coating 12 so as to provide a linerless construction of a roll of such labels 10. Also other standard modifications may be utilized, for example, a tie coat can be provided for facilitating attachment of the thermally sensitive coat 12 to the top face 17 of the substrate 11. Alternatively, the substrate 11 may have no coating on the top face 17 thereof at all. The substrate 11 typically is of paper, but can be of other materials as long as they can be readily separated along the perforation line 13.

As seen in FIG. 2, a perforation line 13 essentially bisects the substrate 11 in order to form first and second body portions 18, 19. Perforation line 13 in the embodiment illustrated in FIG. 2 extends generally transverse to the parallel linear edge portions 20, 20' of the label 10. Instead of linear edge portions 20, 20', a "point" edge, curved edge, or the like could also be provided.

Imaged on the top face 17 (e.g., formed utilizing the thermally sensitive coating 12) of the label 10 is indicia, such as the indicia 21 through 26 illustrated in FIG. 2. The indicia 21 is, for example, the name of the establishment utilizing the labels 10, the indicia 22 is the product packaged utilizing the label 10, the indicia 23 is the incremental units within the package (e.g., weight of the contents), while the indicia 24 is the price per incremental unit (e.g., price per pound). The indicia 25, 25' are human readable and machine readable (bar code) indicia, respectively, which give the total price. The indicia 26 is indicia describing how to utilize the label 10, or the like, and other indicia can also be provided if desired, such as advertising slogans and the like.

Normally, the labels 10 are in continuous format (e.g., roll format), for example, being connected along the edges 20, 20' thereof to other labels until dispensed. This is indicated in dotted line by the label 27 which is connected to the label 10, the edge 20 in that case being a line of weakness until separation therealong takes place. The labels 10 typically are dispensed automatically on site, as by utilizing a conventional Hobart scale 28 which weighs the product to be packaged, thermally prints the indicia 22 through 25' on the label top face 17, and—if the release liner 16 is provided—may even remove the release liner. The indicia 21, 26 typically are preprinted on the label 10 rather than at the dispensing site.

The adhesives 14, 15 may be selected from a wide variety of conventional permanent and repositional adhesives. The permanent adhesive 14 preferably is a pressure sensitive adhesive, although it may be rewettable, heat sensitive, or the like for certain applications. The adhesive 14 is "permanent" in the sense that once it is attached to the particular packaging material with which it is designed to be used, it will not separate from that material but rather tearing of the label substrate 11 will be necessary. The repositional adhesive 15, on the other hand, such as CLEANTAC adhesive from Moore Business Forms, Inc. of Lake Forest, Illinois, readily separates from the underlying packaging material and can be reused. The adhesives 14, 15 together preferably coat the entire bottom face of the substrate 11.

FIGS. 3 and 4 illustrate use of the label 10 in packaging, FIG. 3 illustrating the label 10 in combination with a package, while FIG. 4 illustrates the package of FIG. 3 after it has been opened and resealed.

The package illustrated in FIG. 3 comprises packaging material 29, with packages contents that are sold at the retail establishment, or the like, such as the cold cuts 30 illustrated in FIG. 3. The packaging material 29 has an end edge portion 31 which defines an end thereof. The packaging material 29 may—as illustrated in FIG. 3—be a plastic bag, composite thermoplastic and cellulose fibers bag or sheeting material, paper thin sheet material, or like thin sheet material. Alternatively, the label 10 can be utilized with packages formed of stiff material, such as cardboard, but is ideally suited for use with a flexible bag or thin sheet wrapping material, as illustrated in FIG. 3.

To seal the package of FIG. 3, the end edge portion 31 is folded over to overlie another portion of the thin sheet packaging material 29, and then the label 10 is placed onto both the upper and underlying portions of the packaging material 29 spanning the end edge 31, with the perforation 13 extending generally transverse to the end edge 31.

To open the package of FIG. 3, the user grasps the second body portion 19 of the label 10, and starts peeling it away from the packaging material 29, tearing along the perforation 13. The repositional adhesive 15 allows ready removal of the second body portion 19 from the packaging material 29, while the perforation 13 allows ready tearing of the label 10 therealong. Once the portion 19 has been detached, then the user inserts his or her finger, a sharp edge, or the like, between the overlying and underlying packaging material portions 29 and severs the first label body portion 18 generally along the packaging end edge 31. The severed portion of the first label body portion 18 is shown by reference numeral 33 in FIG. 4.

After severing of the label portion 18, free access is had to the interior contents 30 of the packaging material 29. When it is desired to reseal the package, then the end edge 31 is folded back over the packaging material 29 again (as illustrated in FIG. 4), and the second label body portion 19 is placed so that the repositional adhesive 15 thereof holds it in place spanning the end edge 31. The package may then be opened and closed as desired by the ultimate consumer until the package contents are exhausted.

It will be seen that in order to open the package of FIGS. 3 and 4 it is necessary to tear the label portion 18, thus providing a clear indication that the package has been opened or tampered with. Yet the label portion 19 allows ready and positive resealing of the package.

It will thus be seen that according to the present invention a label, a package, and method of sealing, opening, and resealing a package have been provided which provide a clear indication of package tampering, yet allow ready resealing. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as cover all equivalent structures and procedures.

What is claimed is:

1. A package comprising:

a packaging material including an end edge portion defining an end of said packaging material, and comprising thin sheet wrapping material, said end edge overlying another portion of said thin sheet wrapping material;

a label placed over said end edge portion to hold said end edge portion to said another portion, in a closed position;

said label including indicia imaged on said top face thereof including price per increment indicia, incremental units indicia, and total price indicia;

said label including means for providing an indication that said end edge portion has been opened while allowing resealing of said end edge portion; and wherein said label comprises a substrate having first and second portions with a top face and a bottom face, and wherein said means for providing an indication that said end edge portion has been opened while allowing resealing of said end edge portion comprises permanent, pressure sensitive adhesive associated with said first portion bottom face, repositional pressure sensitive adhesive associated with said second portion bottom face, and a single line of weakness at the border between said first and second portions allowing ready separation of said label at said line of weakness, said line of weakness extending generally transverse to said end edge portion; said permanent and repositional adhesive disposed substantially immediately adjacent each other on opposite sides of said single line of weakness; and both said repositional and permanent adhesives engaging both said edge portion and said another portion of said package.

2. A package as recited in claim 1 wherein said line of weakness comprises a perforation line.

3. A package as recited in claim 1 wherein said indicia are imaged on a thermally sensitive coating on said top face.

4. A package as recited in claim 1 wherein said permanent and repositional adhesives coat substantially the entire bottom face of said label.

5. A package as recited in claim 1 wherein said means defining a single line of weakness consists of a perforation line.

6. A package comprising:

a packaging material including an end edge portion defining an end of said packaging material, and another portion of said packaging material adjacent said end edge portion when in a closed position;

a label placed over said end edge portion to hold said end edge portion to said another portion, in a closed position, said label including a top face with indicia imaged thereon, and a bottom face, said bottom face having a first portion coated with permanent pressure sensitive adhesive, and a second portion coated with repositional pressure sensitive adhesive;

said label connecting said end edge portion to said another portion with both said repositional adhesive and said permanent adhesive engaging both said end edge portion and said another portion; and a line of weakness in said label overlying both said end edge portion and said another portion and separating said repositional and permanent adhesive-coated portions.

* * * * *